US007656463B2

(12) United States Patent
Shibusawa

(10) Patent No.: US 7,656,463 B2
(45) Date of Patent: Feb. 2, 2010

(54) REMOTE CONTROLLER FOR BROADCASTING RECEIVER, BROADCASTING RECEIVER, INFORMATION RECORDED MEDIUM, AND CHANNEL SETTING METHOD

(75) Inventor: Toru Shibusawa, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1074 days.

(21) Appl. No.: 10/784,794

(22) Filed: Feb. 24, 2004

(65) Prior Publication Data

US 2004/0165117 A1 Aug. 26, 2004

(30) Foreign Application Priority Data

Feb. 25, 2003 (JP) ............................. 2003-047690
Feb. 25, 2003 (JP) ............................. 2003-047691

(51) Int. Cl.
*H04N 5/50* (2006.01)
*H04N 5/44* (2006.01)

(52) U.S. Cl. ........................................ 348/731; 348/734

(58) Field of Classification Search ................ 348/725, 348/553, 734, 731–733; 725/37, 39; *H04N 5/44, H04N 5/50*
See application file for complete search history.

(56) References Cited

U.S. PATENT DOCUMENTS

| | | | | |
|---|---|---|---|---|
| 4,318,130 A | * | 3/1982 | Heuer | 348/733 |
| 5,546,193 A | * | 8/1996 | Hailey et al. | 348/731 |
| 5,808,703 A | * | 9/1998 | Karlqvist | 348/734 |
| 6,243,142 B1 | * | 6/2001 | Mugura et al. | 348/564 |
| 7,239,359 B2 | * | 7/2007 | Matsuyama et al. | 348/732 |
| 2001/0008432 A1 | * | 7/2001 | Hayes et al. | 348/734 |
| 2005/0160453 A1 | * | 7/2005 | Kim | 725/39 |

FOREIGN PATENT DOCUMENTS

| | | | |
|---|---|---|---|
| JP | 62-178098 | A | 8/1987 |
| JP | H03-44122 | A | 2/1991 |
| JP | H03-117075 | A | 5/1991 |
| JP | H06-29870 | A | 2/1994 |
| JP | H10-243304 | A | 9/1998 |
| JP | H10-308088 | A | 11/1998 |
| JP | 10-336532 | A | 12/1998 |
| JP | H10-336532 | A | 12/1998 |
| JP | 2000-151444 | A | 5/2000 |

(Continued)

OTHER PUBLICATIONS

Office Action dated Jun. 27, 2006 issued in corresponding Japanese patent application No. 2003-047690.

(Continued)

*Primary Examiner*—Sherrie Hsia
(74) *Attorney, Agent, or Firm*—Westerman, Hattori, Daniels & Adrian, LLP

(57) ABSTRACT

A paper medium having a bar code printed thereon is distributed to a viewer as a leaflet or the like. The bar code has channel setting information related to a certain area recorded thereon. The channel setting information is stored in a non-volatile memory by reading the bar code using a reader in a broadcasting receiver. If a button corresponding to a preset number in a remote controller is pressed, the receiver acquires a physical channel number using the channel setting information, to perform channel selection processing.

21 Claims, 9 Drawing Sheets

FOREIGN PATENT DOCUMENTS

| | | |
|---|---|---|
| JP | 2001-008136 A1 | 1/2001 |
| JP | 2001-103388 A | 4/2001 |
| JP | 2001-148810 A | 5/2001 |
| JP | 2001-230979 A | 8/2001 |
| JP | 2002-300486 A | 10/2002 |
| JP | 2004-260440 A | 9/2004 |

OTHER PUBLICATIONS

Office Action dated Mar. 28, 2006, issued in corresponding Japanese Patent Application No. 2003-047691.

* cited by examiner

Fig. 3

| PRESET NUMBER | BROADCASTING STATION | ANALOG/ DIGITAL | PHYSICAL CHANNEL NUMBER | FREQUENCY [MHz] | PLL DATA | PRIORITY CHANNEL SELECTION |
|---|---|---|---|---|---|---|
| 1 | AOTV | A | 19 | 501.25 | 5578 | |
| 2 | DGTV | D | 24 | 533.00 | 2410 | |
| 3 | ASTV | A | 36 | 603.25 | 6568 | |
| 4 | AMTV | A | 4 | 67.25 | 11A8 | |
| 5 | DMTV | D | 16 | 485.00 | 2110 | |
| 6 | AATV | A | 6 | 83.25 | 1428 | |
| 7 | DATV | D | 15 | 479.00 | 20B0 | |
| 8 | AKTV | A | 8 | 181.25 | 2378 | |
| 9 | DKTV | D | 17 | 491.00 | 2170 | |
| 10 | AXTV | A | 10 | 193.25 | 2558 | |
| 11 | DYTV | D | 14 | 473.00 | 2050 | |
| 12 | DETV | D | 21 | 515.00 | 22F0 | ○ |

Fig. 4

| PRESET NUMBER | ANALOG/ DIGITAL | PHYSICAL CHANNEL NUMBER | PRIORITY CHANNEL SELECTION |
|---|---|---|---|
| 1 | A | 19 | |
| 2 | D | 24 | |
| 3 | A | 36 | |
| 4 | A | 4 | |
| 5 | D | 16 | |
| 6 | A | 6 | |
| 7 | D | 15 | |
| 8 | A | 8 | |
| 9 | D | 17 | |
| 10 | A | 10 | |
| 11 | D | 14 | |
| 12 | D | 21 | ○ |

Fig. 5

| PRESET NUMBER | ANALOG/ DIGITAL | PHYSICAL CHANNEL NUMBER | BROADCASTING STATION | PRIORITY CHANNEL SELECTION |
|---|---|---|---|---|
| 1 | A | 19 | AOTV | |
| 2 | D | 24 | DGTV | |
| 3 | A | 36 | ASTV | |
| 4 | A | 4 | AMTV | |
| 5 | D | 16 | DMTV | |
| 6 | A | 6 | AATV | |
| 7 | D | 15 | DATV | |
| 8 | A | 8 | AKTV | |
| 9 | D | 17 | DKTV | |
| 10 | A | 10 | AYTV | |
| 11 | D | 14 | DYTV | |
| 12 | D | 21 | DETV | ○ |

Fig. 6

| PHYSICAL CHANNEL NUMBER | DIGITAL | | ANALOG | | BROADCASTING STATION |
|---|---|---|---|---|---|
| | FREQUENCY | PLL DATA | FREQUENCY | PLL DATA | |
| 2 | 57 | | 55.25 | 0FC8 | |
| 3 | 63 | | 61.25 | 10B8 | |
| 4 | 69 | | 67.25 | 11A8 | AMTV |
| 5 | 79 | | 77.25 | 1338 | |
| 6 | 85 | | 83.25 | 1428 | AATV |
| 7 | 177 | | 175.25 | 2288 | |
| 8 | 183 | | 181.25 | 2378 | AKTV |
| 14 | 473 | 2050 | 471.25 | 50C8 | DYTV |
| 15 | 479 | 20B0 | 477.25 | 51B8 | DATV |
| 16 | 485 | 2110 | 483.25 | 52A8 | DMTV |
| 17 | 491 | 2170 | 489.25 | 5398 | DKTV |
| 82 | 881 | 39D0 | 879.25 | 9088 | |
| 83 | 887 | 3A30 | 885.25 | 9178 | |

| PRESET NUMBER | ANALOG/ DIGITAL | PHYSICAL CHANNEL NUMBER |
|---|---|---|
| 1 | A | 19 |
| 2 | D | 24 |
| 3 | A | 36 |
| 4 | A | 4 |
| 5 | D | 16 |
| 6 | A | 6 |
| 7 | D | 15 |
| 8 | A | 8 |
| 9 | D | 17 |
| 10 | A | 10 |
| 11 | D | 14 |
| 12 | D | 21 |

REMOTE CONTROLLER FOR BROADCASTING RECEIVER, BROADCASTING RECEIVER, INFORMATION RECORDED MEDIUM, AND CHANNEL SETTING METHOD

BACKGROUND OF THE INVENTION

Field of the Invention

The present invention relates to a remote controller for a broadcasting receiver, a broadcasting receiver, an information recorded medium, and a channel setting method.

When a broadcasting receiver is employed, setting for tuning in to broadcasting stations which are receivable in an area where the broadcasting receiver is installed is previously performed. Data representing a channel selection frequency (a physical channel) is written into a memory contained in the main body of the receiver. When a preset button in a remote controller is pressed, a preset number is transmitted to the main body of the receiver, and information related to a physical channel corresponding to the preset number which has been registered on the side of the main body of the receiver is referred to, so that PLL data, for example, required to receive radio waves having the frequency of the physical channel is produced, and the PLL data is fed to a tuner so that channel selection processing is performed. When direct channel selection is performed by the remote controller, a channel number is transmitted to the main body of the receiver, PLL data required to receive the frequency of the physical channel corresponding to the channel number is produced on the side of the main body of the receiver, and the PLL data is fed to the tuner so that channel selection processing is performed (see JP-A-2001-8136).

Channel presetting is changed when the place where the receiver is installed is changed due to house-moving or the like, or is changed when a transmitting station is newly installed or is abandoned. The work of change in channel presetting is complicated, and takes a lot of time if channels are increased.

Although it is of course possible for a user to refer to an instruction manual himself or herself to perform setting work, the possibility of secondary defects due to an incompletion in work is also estimated because the setting work is complicated.

SUMMARY OF THE INVENTION

In view of the foregoing circumstances, an object of the present invention is to provide a remote controller for a broadcasting receiver, a broadcasting receiver, an information recorded medium, and a channel setting method capable of easily resetting in case of house-moving and easily performing initial setting when broadcasting receiver is newly purchased and installed.

In order to solve the above-mentioned problem, a broadcasting receiver according to the present invention is characterized by comprising a reader for reading from a medium having channel setting information recorded thereon the channel setting information; a rewritable nonvolatile memory storing the read channel setting information; and means for judging a channel to be selected on the basis of a remote control signal for channel selection transmitted from a remote controller and the channel setting information.

In the above-mentioned configuration, the channel setting information read from the medium is stored in the nonvolatile memory. For example, in a certain area, a physical channel "19" may be assigned to a preset number "1", or shall be thus intentionally assigned. On the side of the receiver, a correspondence between the preset number "1" and the physical channel "19" can be acquired using the channel setting information. By pressing a button with the preset number "1" in the remote controller, therefore, the receiver performs processing for selecting the physical channel "19".

The reader may read any one of optical information, magnetic information, and weak radio wave information.

Furthermore, there may be provided means for setting a channel to be received after release of a stand-by state on the basis of priority channel information included in the channel setting information.

In order to solve the above-mentioned problem, in a remote controller for a broadcasting receiver that carries out channel selection control of the broadcasting receiver, a remote controller for a broadcasting receiver according to the present invention is characterized by comprising a reader for reading from a medium having channel setting information recorded thereon the channel setting information; and transmission means for transmitting to the broadcasting receiver the whole or a part of the read channel setting information.

In the above-mentioned configuration, the channel setting information read from the medium is transmitted from the remote controller for a broadcasting receiver to the broadcasting receiver. The broadcasting receiver may store in a memory the transmitted channel setting information. For example, in a certain area, a physical channel "19" may be assigned to a preset number "1", or shall be thus intentionally assigned. On the side of the receiver, a correspondence between the preset number "1" and the physical channel "19" can be acquired using the channel setting information. By pressing a button with the preset number "1" in the remote controller, therefore, the receiver performs processing for selecting the physical channel "19". Even if the button with the preset number "1" is pressed using a general remote controller, the receiver performs processing for selecting the physical channel "19".

In the remote controller for a broadcasting receiver having the above-mentioned configuration, the transmission means may utilize a remote control signal transmitter already provided in the remote controller. That is, the transmission means may be separately provided. By utilizing the remote control signal transmitter already provided, however, the cost of the remote controller for a broadcasting receiver can be reduced.

In a remote controller for a broadcasting receiver that carries out channel selection control of the broadcasting receiver, a remote controller for a broadcasting receiver according to the present invention is characterized by comprising a reader for reading from a medium having channel setting information recorded thereon the channel setting information; a rewritable nonvolatile memory storing the read channel setting information; and means for generating a remote control signal on the basis of the contents of an operation and the channel setting information.

In the above-mentioned configuration, the channel setting information read from the medium is registered in the remote controller for a broadcasting receiver. For example, in a certain area, a physical channel "19" may be assigned to a preset number "1", or shall be thus intentionally assigned. The remote controller can acquire a correspondence between the preset number "1" and the physical channel "19" using the channel setting information. By pressing a button with the preset number "1" in the remote controller, therefore, the remote controller feeds to the receiver information for selecting the physical channel "19", and the receiver performs processing for selecting the physical channel "19", so that channel selection is suitably carried out.

The remote controller may comprise acquisition means for acquiring the channel setting information from another remote controller or another apparatus. That is, the channel setting information may be acquirable from not only a medium having the channel setting information recorded thereon but also another remote controller having the same function in which the channel setting information has already been registered or an apparatus placed in an electric appliance shop or the like.

In such a configuration, the acquisition means may utilize the reader. This makes it possible to reduce the cost of the remote controller.

The reader may read any one of optical information, magnetic information, and weak radio wave information.

A broadcasting receiver according to the present invention is characterized by comprising means for storing in a rewritable nonvolatile memory channel setting information transmitted from a remote controller for the broadcasting receiver; and means for judging a channel to be selected on the basis of a remote control signal for channel selection transmitted from the remote controller for the broadcasting receiver and the channel setting information.

A broadcasting receiver according to the present invention is characterized by comprising means for storing in a rewritable nonvolatile memory channel setting information transmitted from a remote controller for the broadcasting receiver; and means for setting a channel to be received after release of a stand-by state on the basis of priority channel information included in the channel setting information.

The broadcasting receiver may be so configured that the channel setting information transmitted from the remote controller for the broadcasting receiver is received utilizing a remote control signal receiver.

An information recorded medium according to the present invention is characterized in that it has a distributable form, and channel setting information is recorded in a readable state by any one of reading utilizing light, reading utilizing magnetism, and reading utilizing weak radio waves.

In the information recorded medium, the above-mentioned information may be recorded using paper as a base. This is desirable in terms of cost reduction.

The channel setting information may be information in which a preset number corresponds to at least one of a physical channel number, receiving frequency information, and tuner control information.

The channel setting information may include information representing a logical channel number with respect to a preset number.

The channel setting information may include information showing whether the broadcasting is analog broadcasting or digital broadcasting with respect to a preset number.

The channel setting information may include priority channel information for setting a channel to be received after release of a stand-by state.

A channel setting method according to the present invention is characterized by comprising the step of transmitting channel setting information to a communication device by communication such that the channel setting information can be read utilizing light by being printed.

In the channel setting method, the channel setting information may be information in which a preset number corresponds to at least one of a physical channel number, receiving frequency information, and tuner control information.

The channel setting information may include information representing a logical channel number with respect to a preset number.

The channel setting information may include information showing whether the broadcasting is analog broadcasting or digital broadcasting with respect to a preset number.

The channel setting information may include priority channel information for setting a channel to be received after release of a stand-by state.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an explanatory view illustrating channel setting information related to an area where a broadcasting receiver is placed;

FIG. 4 is an explanatory view illustrating channel setting information recorded on a bar code or the like;

FIG. 5 is an explanatory view illustrating channel setting information stored in a nonvolatile memory in a receiver;

FIG. 6 is an explanatory view illustrating a physical channel—frequency information stored in a ROM in a CPU in a receiver;

FIG. 8(a) is a perspective view, and FIG. 8(b) is an enlarged front view;

FIG. 11 is an explanatory view illustrating channel setting information recorded on a bar code or the like.

DESCRIPTION OF THE PREFERRED EMBODIMENTS

Embodiment 1

A first embodiment of the present invention will be described on the basis of FIGS. 1 to 6. In an area where a broadcasting receiver 30 is placed, channels are desirably set, as shown in FIG. 3, or channels shall be intentionally set.

Figure 1:
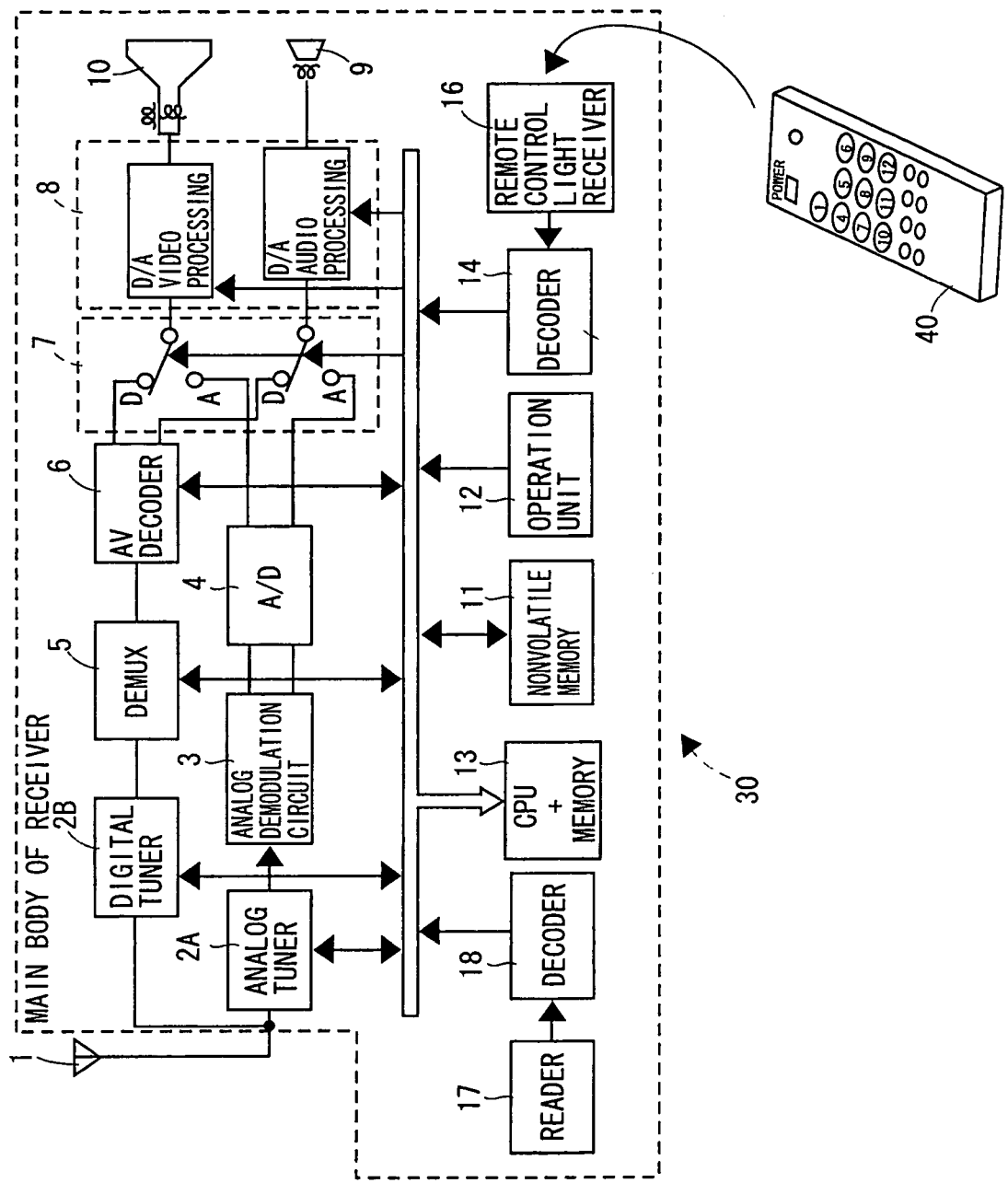
FIG. 1 is a block diagram showing a broadcasting receiver and a remote controller according to an embodiment of the present invention.

FIG. 1 is a block diagram showing a broadcasting receiver 30 according to the embodiment in which both terrestrial digital broadcasting and terrestrial analog broadcasting can be viewed.

In FIG. 1, a terrestrial wave antenna 1 is arranged in a predetermined direction outdoors, and receives terrestrial broadcasting waves. The terrestrial wave antenna 1 feeds a received signal to tuners 2A and 2B.

The analog tuner 2A tunes in to radio frequencies (RF) from the antenna 1, and converts the radio frequencies into intermediate frequencies (IF). The tuner 2A comprises a first-stage amplifier for amplifying a received RF signal (a high-frequency signal), an AGC (Automatic Gain Control) amplifier for making gain variable by a control voltage from the exterior, a mixer for generating an IF signal having a frequency which is the difference between a local frequency generated by an oscillator and the received RF signal, a PLL (Phase-Locked Loop) circuit for controlling the oscillator to a state where a predetermined frequency is outputted by channel selection (PLL) data fed from a CPU (Central Processing Unit) 13, an intermediate frequency amplifier, and so forth. Further, the analog tuner 2A comprises various types of trap circuits, and amplifies, from intermediate frequencies outputted from the intermediate frequency amplifier, the intermediate frequency in a required band with a high gain. An analog demodulation circuit 3 detects a video signal having the amplified intermediate frequency, to extract a color television signal (a luminance signal, a chrominance signal, a synchronizing signal) as well as to detect an audio signal having the intermediate frequency. The demodulated video signal and audio signal are changed into digital signals by an analog-to-digital (A/D) converter 4. The digital signals (video data/ audio data) are inputted to a selection switch 7.

A digital tuner 2B comprises the same frequency selection function as the above-mentioned analog tuner 2A, and comprises a demodulation circuit, an inverse interleave circuit, an error correcting circuit, and so forth, thereby demodulating a selected digital modulation signal to output a transport stream. A demultiplexer (DEMUX) 5 separates the transport stream into a video stream and an audio stream based on an MPEG2 (Moving Picture Expert Group2), PSI/SI (Program Specific Information/Service Information), and so forth. The demultiplexer 5 feeds the video stream and the audio stream to an AV decoder 6, and feeds to the CPU 13 program information or the like included in the PSI/SI.

The AV decoder 6 comprises a video decoder for decoding the video stream and an audio decoder for decoding the audio stream. The video decoder decodes a variable length code which has been inputted, to find a quantization factor and a motion vector, thereby carrying out inverse DCT (Discrete Cosine Transformation), motion compensation control based on the motion vector, and the like. The audio decoder decodes a coded signal which has been inputted, to produce audio data. The video data/audio data generated by the decoding are inputted to the selection switch 7.

The selection switch 7 receives video/audio data based on analog broadcasting and video/audio data based on digital broadcasting, and selects and outputs either one of the video/ audio data by an instruction from the CPU 13.

An output processing unit 8 subjects the video/audio data to various types of processing, and performs digital-to-analog (D/A) conversion processing, to generate a video signal to drive a display (a CRT (Cathode Ray Tube), etc.) 10. Further, an audio signal is amplified, and is fed to a speaker 9. Further, the output processing unit 8 also performs processing for superimposing an OSD signal outputted from an OSD (On-Screen Display) circuit (not shown) into the received video signal.

A remote controller 40 comprises various types of keys, for sending out various types of commands to the broadcasting receiver 30, and sends out signal light (a remote control signal) meaning a command corresponding to the operated key from a light emitter. A remote control light receiver 16 receives the above-mentioned signal light (remote control signal), converts the received signal light into an electric signal, and feeds the electric signal to a decoder 14.

A nonvolatile memory (an EEFROM (Electrically Erasable and Programmable ROM), a flash memory, etc.) 11 stores channel setting information corresponding to a certain area, for example, a correspondence between a preset number (a position number) in the remote controller 40 and an existent station physical channel number, and a code showing whether the broadcasting is analog broadcasting or digital broadcasting, as shown in FIG. 5. The channel setting information in the nonvolatile memory 11 is one previously stored at the time of shipping from a factory or read by a reader 17 (this will be described later). The information in the nonvolatile memory 11 can be rewritable by electrical processing.

An operation section 12 include a power key and a channel up-down key, and so forth. The operation section 12 is provided in the broadcasting receiver 30.

The CPU 13 performs overall control in the broadcasting receiver 30, and a memory (ROM) in the CPU 13 comprises a table representing the relationship between a physical channel number and a frequency (PLL data), as shown in FIG. 6, together with various types of operating programs.

Furthermore, the broadcasting receiver 30 comprises the reader 17 and a decoder 18. The reader 17 may be fixedly provided on an outer surface of a case of the broadcasting receiver 30, or may be provided so as to be drawable by a cable or the like. The reader 17 is composed of a bar code reader, a magnetic reader, a weak radio wave reader, etc., for example. The reader 17 comprises an auxiliary light emitter and a light receiver when it is composed of the bar code reader. The magnetic reader comprises a magnetic head, to read magnetic information. The weak radio wave reader receives weak radio waves emitted from an IC tag or the like. The decoder 18 decodes information read in the reader 17 and transmits the decoded information to the CPU 13. The CPU 13 stores the information obtained by the decoding in the nonvolatile memory 11.

Figure 2:
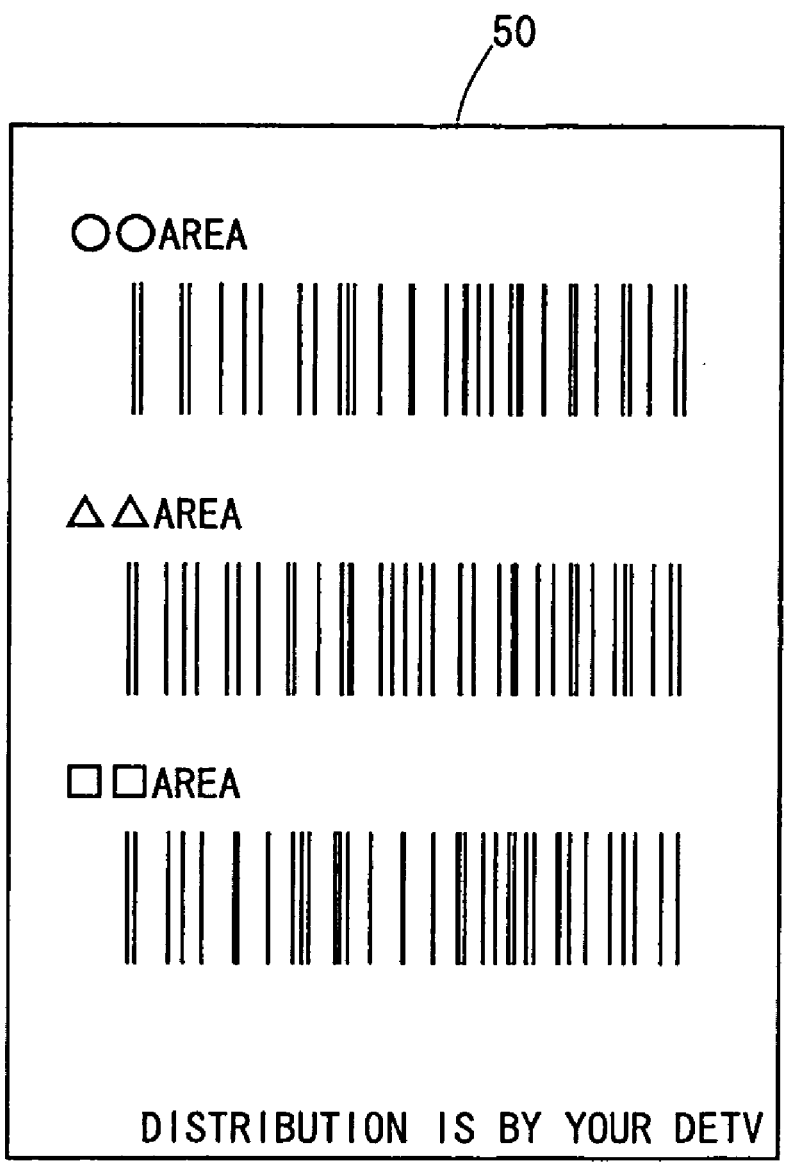
FIG. 2 is an explanatory view showing a paper medium having bar codes printed thereon.

Information to be read by the reader 17 is channel setting information. That is, the channel setting information corresponds to the whole or a part of the channel setting information stored in the nonvolatile memory 11 in the above-mentioned broadcasting receiver 30, and is as illustrated in FIG. 4 by means of example. Such channel setting information is recorded using a paper medium, a magnetic medium on paper, an IC tag embedded in paper, etc. as a bar code, a punch card, magnetic information, weak radio wave information, etc., and is provided to a viewer as a leaflet, a newspaper, a magazine, a card, etc. FIG. 2 illustrates a paper medium 50 having bar codes printed thereon. When the IC tag is utilized, the channel setting information can be accepted in the receiver 30 only by being brought near the reader 17. The reader 17 can be made indistinctive in appearance. The CPU 13 may utilize an OSD function when it reads the channel setting information, to display a confirmation screen indicating a message "May I change channel setting" and a button "YES/NO".

After the receiver 30 is installed, work for registering in the receiver broadcasting stations which can be received in an area where the receiver 30 is installed prior to viewing broadcasting is required. Although channels corresponding to a plurality of preset numbers have been conventionally tuned in to, to register the broadcasting stations one at a time, a paper medium (printing) 50 having channel setting in formation related to each area recorded thereon as a bar code is distributed by a broadcasting station, a newspaper office, an electric appliance shop, etc. The-viewer obtains the paper medium (printing) 50, and causes the receiver 30 to read the bar code.

When the power to the receiver 30 is turned on, the CPU 13 reads out the channel setting information written into the nonvolatile memory 11 at the time of shipping from a factory, and an arbitrary channel is selected in the receiver 30 using the channel setting information. Here, when the viewer causes the reader 17 to read the bar code on the paper medium 50, the contents of the read bar code are decoded by the decoder 18, and the CPU 13 acquires the channel setting information and writes the acquired channel setting information into the nonvolatile memory 11.

Although the relationship between a preset number and a channel to be received (a physical channel) may be arbitrary, the combination may be freely settable at the discretion of a person who has created the paper medium 50. Even if the transition from analog broadcasting to digital broadcasting occurs, therefore, the same preset number as a channel number with which a user has been conventionally familiar and which is also equal to an image or a brand as a broadcasting station can be used as usual.

By the above-mentioned operations, the channel information which is receivable in the area is registered in the receiver 30. Even if a channel selection button in the operation section 12 in the receiver 30 is operated, therefore, channel selection is possible.

(Channel Selection Operation by Remote Controller)

When a viewer presses a channel selection button "12", for example, in an operation section in the remote controller 40, a code representing a preset number corresponding to the-button number "12" is read out, and is transmitted from a light emitter in the remote controller 40. When the remote control light receiver 16 in the receiver 30 receives a remote control signal sent out from the remote controller 40, "12" which is a received preset number is decoded in the decoder 14, and is transmitted to the CPU 13. The CPU 13 refers to the channel setting information stored in the nonvolatile memory 11, to read information (<digital>, a physical channel <21>) corresponding to the preset number "12". PLL data for digital tuner setting <22F0>corresponding to the physical channel <21> and the digital <D> is then read from the table stored in the ROM in the CPU 13, and is fed to the digital tuner 2B to perform a channel selection operation, and the selection switch 7 is connected to the side of <D>. Consequently, DETV on the physical channel 21 and with a frequency of 515.00 MHz is received.

Although in the above-mentioned example of processing, it is assumed that the code representing the preset number corresponding to the button number is sent out when the channel selection button in the remote controller 40 is pressed, channel selection using a direct channel selection function is also possible. The direct channel selection is a method of directly designating and entering a physical channel number using channel selection buttons "1" to "10" (0). When the direct channel selection is performed, the user presses a direct channel selection designation button (not shown) in the remote controller 40, subsequently presses a button (not shown) for designating analog/digital, and subsequently enters a physical channel number of one digit or a plurality of digits. Consequently, the remote controller 40 carries out such control as to transmit a code representing direct channel selection, a code for judging analog/digital, and a physical channel number. The receiver 30 receives the remote control signal from the remote controller 40 to perform decoding, and the CPU 13 refers to a table stored in the nonvolatile memory 11. That is, although the CPU 13 refers to the tuner setting PLL data (see FIG. 6) on the basis of the physical channel number received from the remote controller 40, channels differ in channel selection frequency between analog broadcasting and digital broadcasting even if they have the same physical channel number. By an analog/digital identification code transmitted from the remote controller 40, therefore, it is possible to read the corresponding PLL data, feed data to the tuner (2A/2B), and also switch the selection switch 7.

Although a frequency corresponding to a physical channel number is described in FIG. 6, the frequency need not be necessarily stored on the nonvolatile memory 11.

Priority channel selection will be then described. In a case where the power is turned on and a case where a stand-by mode is released, the CPU 13 retrieves a priority channel to be selected which has been registered in the nonvolatile memory 11, and performs channel selection processing such that a program on the registered channel is projected if it is previously registered. If information related to the priority channel to be selected is recorded on the above-mentioned bar code or the like, the priority channel can be automatically set on the basis of the information. Therefore, a channel intended by a company (a broadcasting station, a newspaper office, an electric appliance shop, etc.) which distributes the paper medium 50 is selected at the time of turning on the power to the receiver 30 and at the time of releasing a stand-by state (turning TV on).

Although in the above-mentioned example, the channel setting information shall be recorded on a paper medium, a magnetic medium on paper, an IC tag embedded in paper or the like, etc. as a bar code, a punch card, magnetic information, weak radio wave information, etc., it may be recorded on not only paper but also a plastic card or the like.

Figure 12:
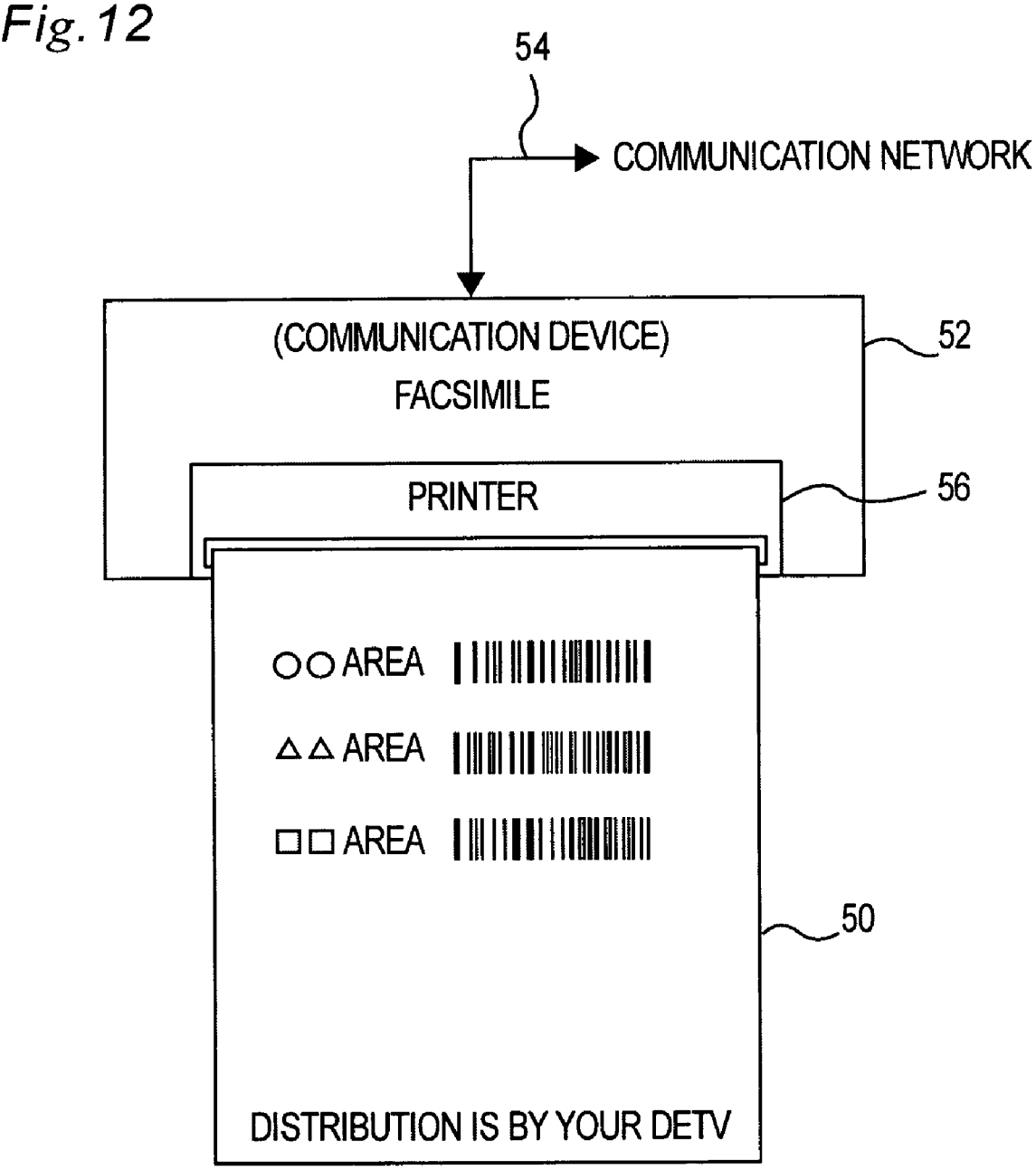
FIG. 12 is an explanatory view illustrating received channel setting information being printed by a printer of a communication device (facsimile).

Furthermore, the present invention is not limited to the distribution of a leaflet having a bar code or the like printed thereon, for example. As shown in FIG. 12, electronic information corresponding to a figure (a pattern) of the bar code or the like is transmitted to a facsimile 52 or a personal computer of a viewer through a communication network 54, and the bar code or the like is printed on the paper medium 50 on the side of the viewer by printing means 56. The bar code or the like may be read by the reader 17. Of course, in the bar code or the like in this case, channel setting information corresponding to an area may be information in which a preset number corresponds to at least one of a physical channel number, receiving frequency information, and tuner control information. The channel setting information corresponding to an area may include information representing a logical channel number with respect to a preset number. Further, the channel setting information corresponding to an area may include information indicating which of analog broadcasting and digital broadcasting is performed with respect to a preset number. Further, the channel setting information corresponding to an area may include priority channel information for setting a channel to be received after release of a stand-by state. The logical channel number means information for selecting a sub-channel. For example, it is assumed that data corresponding to a main channel and data corresponding to a sub-channel exist in a certain transport stream. The logical channel number is a channel number giving which of the data should be selected, and the channel number corresponds to a preset number. Consequently, the CPU 13 which has received the preset number to judge a logical channel number corresponding thereto controls the demultiplexer 5 on the basis of the logical channel number to fetch a desired packet.

In the nonvolatile memory 11 in the receiver 30, a capacity which is twice a capacity capable of storing channel setting information is ensured so that the channel setting information read this time and the last channel setting information together exist. A user's operation may make it possible to return to the last channel setting information.

As described in the foregoing, according to the present invention, the effect of easily resetting in case of house-moving and easily performing initial setting when broadcasting receiver is newly purchased and installed is produced.

Embodiment 2

Although a second embodiment of the present invention will be described on the basis of FIGS. 7 to 11, the drawings used in the first embodiment shall be suitably used. In an area where a broadcasting receiver 130 is placed, channels are desirably set, as shown in FIG. 3, or channels shall be thus intentionally set.

Figure 7:
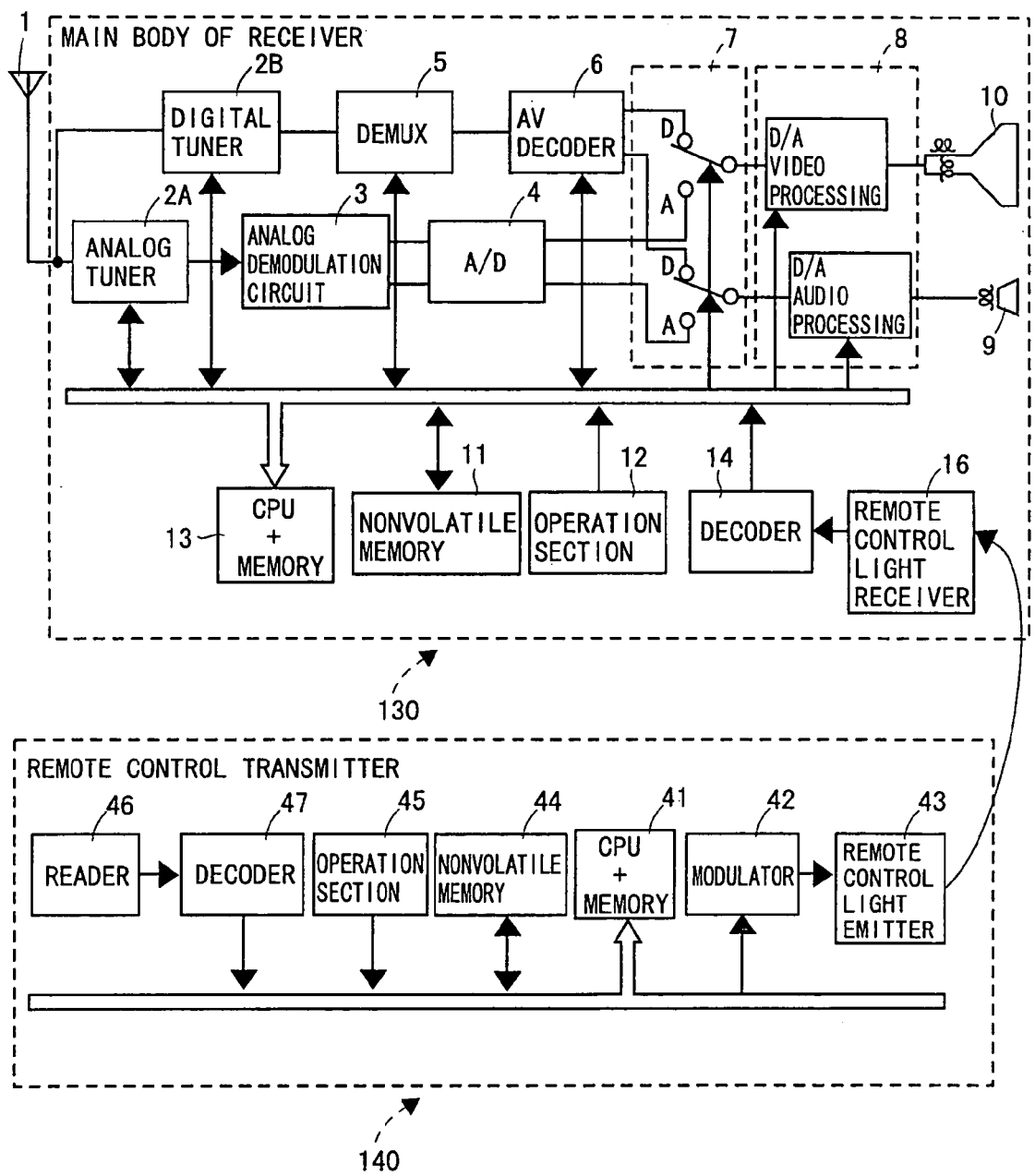
FIG. 7 is a block diagram showing a broadcasting receiver and a remote controller according to another embodiment of the present invention.
Figure 8:
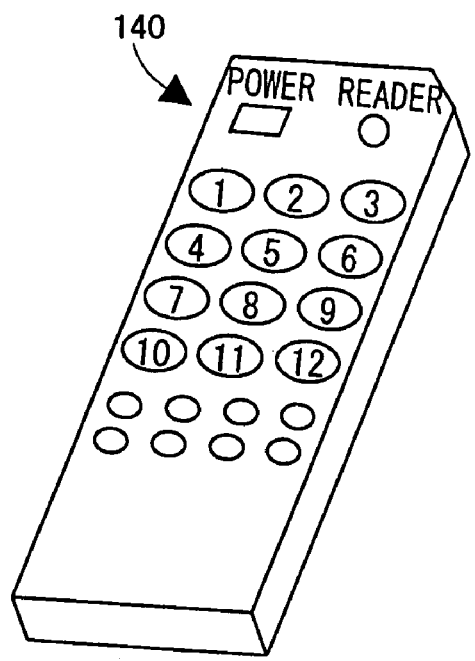
FIG. 8 is a diagram showing a remote controller, where
Figure 8:
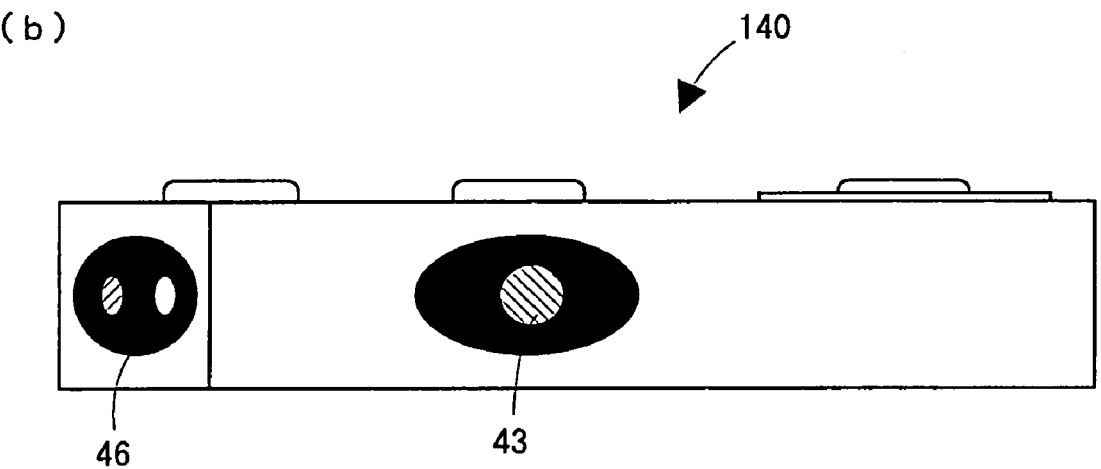

FIG. 7 is a block diagram showing a broadcasting receiver 130 and a remote controller 140 according to the present embodiment in which both terrestrial digital broadcasting and terrestrial analog broadcasting can be viewed.

Although the broadcasting receiver 130 has the same configuration as that of the broadcasting receiver 30 shown in FIG. 1, it does not comprise the reader 17 and the decoder 18.

The remote controller 140 comprises a reader 46, a decoder 47, and a nonvolatile memory (an EEPROM, a flash memory, etc.) 44. The appearance of the remote controller 140 has a shape whose one corner is chamfered, and the reader 46 is arranged in the chamfered corner, as shown in FIGS. 8(a) and 8(b). The reader 46 is composed of a bar code reader, a magnetic reader, a weak radio wave reader, etc., for example. The reader 46 comprises an auxiliary light emitter (not indispensable) and a light receiver when it is composed of the bar code reader. The magnetic reader comprises a magnetic head, to read magnetic information. The weak radio wave reader receives weak radio waves emitted from an IC tag or the like. The decoder 47 decodes information read by the reader 46, and transmits the decoded information to a CPU 41. The CPU 41 stores information obtained by the decoding in the non-volatile memory 44.

Information to be read by the reader 46 in the remote controller 140 is channel setting information. That is, the channel setting information corresponds to the whole or a part of the channel setting information stored in the nonvolatile memory 11 in the above-mentioned broadcasting receiver 30, and is as illustrated in FIG. 11 by means of example. Such channel setting information is recorded on a paper medium, a magnetic medium on paper, an IC tag embedded in paper, etc. as a bar code, a punch card, magnetic information, weak radio wave information, etc., and is provided to a viewer as a leaflet, a newspaper, a magazine, a card, etc. A paper medium having bar codes printed thereon is as illustrated in FIG. 2.

Figure 9:
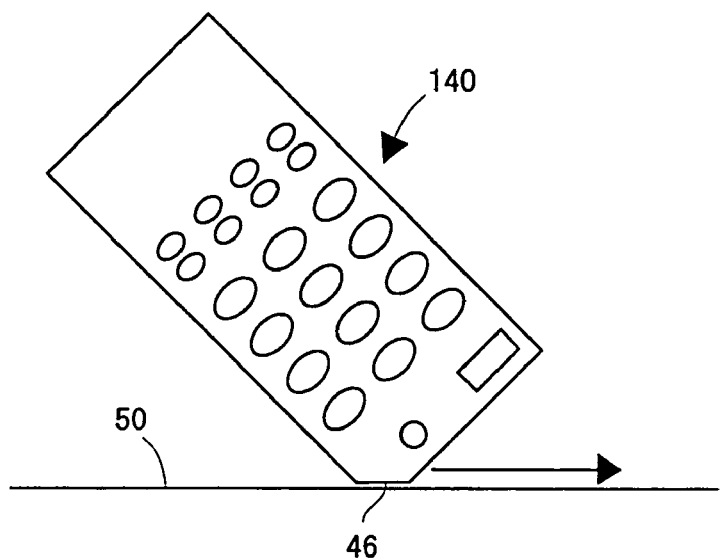
FIG. 9 is an explanatory view showing how a bar code on a paper medium is read by a remote controller.

When the remote controller 140 is caused to read the bar code, relative movement is made in a direction indicated by an arrow while pressing a predetermined key in the remote controller 140 in a state where the reader 46 in the remote controller 140 is directed toward the bar code as illustrated in FIG. 9. Consequently, the channel setting information which the bar code has is read, and is stored in the nonvolatile memory 44 in the remote controller 140. By operating the predetermined key after the above-mentioned information is accepted in the remote controller 140, signal light corresponding to the information is emitted from a remote controller light emitter 43, and is received by a remote control light receiver 16 in the receiver 130. By the processing of a CPU 13 in the receiver 130, the above-mentioned information (channel setting information) is written (rewritten) into the non-volatile memory 11. The CPU 13 may display a confirmation screen showing a message "My I change channel setting" and a button "YES/NO" utilizing an OSD function when it receives the channel setting information.

As also described in the first embodiment, a broadcasting station, a newspaper office, an electric appliance shop, or the like distributes a paper medium (printing) 50 having channel setting information related to each area recorded thereon as a bar code. The viewer obtains the distributed paper medium 50, and causes the remote controller 140 to read the bar code.

The viewer presses a reader button in an operation section in the remote controller 140 in a state where the reader 46 in the remote controller 140 is applied to the paper medium 50, as illustrated in FIG. 9. By the operation, infrared light, for example, are irradiated from the auxiliary light emitter in the reader 46. When the bar code representing the corresponding area on the paper medium 50 is manually scanned, reflected light corresponding to the barcode on the paper medium 50 is detected by the light receiver in the reader 46, detection information is sent to the decoder 47, and channel setting information written as the bar code (a physical channel number in a broadcasting station which can be received in the area and a preset number, a code showing whether the broadcasting is analog broadcasting or digital broadcasting, a priority channel selection code, etc.) is decoded. The decoded channel setting information is written into the nonvolatile memory 44 by the CPU 41.

When the power to the receiver 130 is turned on, the CPU 13 reads out the channel setting information written into the nonvolatile memory 11 at the time of shipping from a factory, and an arbitrary channel is selected in the receiver 130 using the channel setting information. Here, when the viewer presses a data transfer button (not shown) in the operation section in the remote controller 140, the channel setting information recorded on the paper medium 50, previously described, that is, the channel setting information written into the non-volatile memory 44 by reading the bar code is read out of the nonvolatile memory 44 by the CPU 41. The channel setting information is sent to a modulator 42 and is modulated therein, and is then transmitted to the remote controller light emitter 43, and modulated infrared light (a remote control signal) is sent out from the remote controller light emitter 43. When the remote control light receiver 16 in the receiver 130 captures the above-mentioned infrared light, converts the captured infrared light into an electric signal, and feeds the electric signal to the decoder 14, the channel setting information transmitted by the remote controller 140 is reproduced (decoded). The CPU 13 writes the channel setting information into the nonvolatile memory 11.

(Channel Selection Operation by Remote Controller)

When a viewer presses a channel selection button "12", for example, in the operation section in the remote controller 140, a code representing a preset number corresponding to the button number "12" is read out of the CPU 41, is modulated in the modulator 42, and is then transmitted from the remote controller light emitter 43. When the remote control light receiver 16 in the receiver 130 receives modulated light sent out from the remote controller light emitter 43, "12" which is the received preset number is decoded in the decoder 14, and is transmitted to the CPU 13. The CPU 13 refers to the channel setting information stored in the nonvolatile memory 11, to read information (<digital>, a physical channel <21>) corresponding to the preset number "12". PLL data for digital tuner setting <22F0> corresponding to the physical channel <21> and the digital <D> is then read from a table stored in the ROM in the CPU 13, and is fed to a digital tuner 2B to perform a channel selection operation, and a selection switch 7 is connected to the side of <D>. Consequently, DETV on the physical channel 21 and with a frequency of 515.00 MHz is received (see FIG. 3).

Although in the above-mentioned example of processing, it is assumed that the code representing the preset number corresponding to the button number is sent out when the channel selection button in the remote controller 40 Ls pressed, channel selection using a direct channel selection function is possible. The direct channel selection has been described in the first embodiment.

Furthermore, PLL data corresponding to a preset number shall be recorded as channel setting information recorded as a bar code or the like, and the remote controller 140 which has read the PLL data may transmit the PLL data as a remote control signal on the basis of the number of an operation button. The receiver 130 can also receive the remote control signal from the remote controller 140 to acquire the PLL data, and the CPU 13 can also refer to data (see FIG. 6) in the ROM on the basis of the PLL data to directly send the data to the tuner (2A/2B)

Although a frequency corresponding to the physical channel number is described in FIG. 3, the frequency need not be necessarily stored on the nonvolatile memories 11 and 44.

Figure 10:
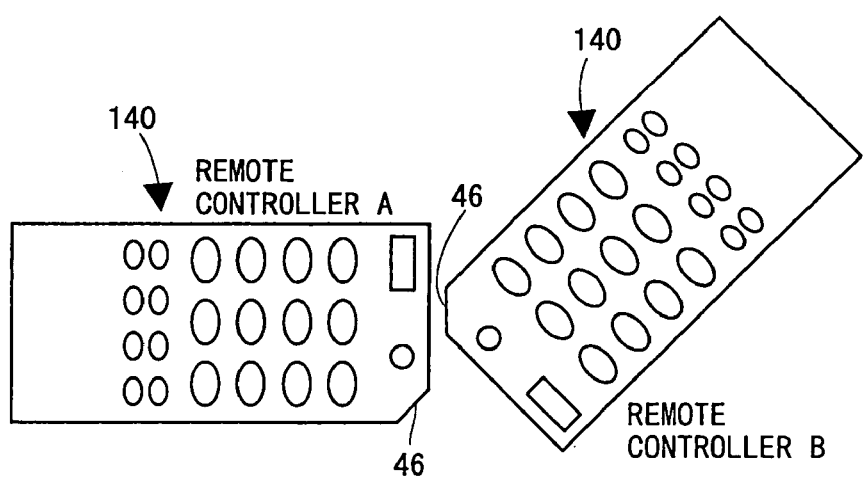
FIG. 10 is an explanatory view showing how channel setting information is transmitted from one side to the other side in two remote controllers according to an embodiment of the present invention.

If channel setting information is stored once in the nonvolatile memory 44 in the remote controller 140, the channel setting information can be easily copied, even if there is no printing, on a remote controller of the same type-by transmitting the contents of the nonvolatile memory 44 from a remote controller light emitter 43 in a remote controller 140 (AP and receiving the transmitted contents in a light receiver in a reader 46 in a remote controller 140 (B), as shown in FIG. 10. Further, an electric appliance shop or the like comprises an apparatus for providing channel setting information, thereby making it possible for a viewer to go to the electric appliance shop with his or her remote controller 140 and to receive the channel setting information from the apparatus by the reader 46.

In the above-mentioned example, the contents of the bar code or the like (the channel setting information) are transferred to the nonvolatile memory 11 in the receiver 130. Channel selection is possible even by using a conventional remote controller which can transmit only a preset number.

Although description was made of the example in which the auxiliary light source is arranged in the reader 46 such that when the remote controller is caused to read the bar code, the bar code can be read even under low illumination, the reader 46 may be arranged in the vicinity of the remote controller light emitter 43, to continuously turning on the remote controller light emitter 43 when the bar code is read.

The bar code or the like printed by a facsimile or a printer may be read by the remote controller 140.

in the nonvolatile memory 44 in the remote controller 140 or the nonvolatile memory 11 in the receiver 130, a capacity which is twice a capable of storing channel setting information is ensured so that the channel setting information read this time and the last channel setting information exist. A user's operation may make it possible to return to the last channel setting information.

As described in the foregoing, according to the present invention, the effect of easily resetting in case of housemoving and easily performing initial setting when broadcasting receiver is newly purchased and installed is produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcasting receiver comprising:
   a reader for reading from a medium having channel setting information recorded thereon the channel setting information;
   a rewritable nonvolatile memory storing the read channel setting information; and
   a section for judging a channel to be selected on the basis of a remote control signal for channel selection transmitted from a remote controller and said channel setting information,
   wherein the remote control signal for channel selection is a preset code corresponding to a channel selection button on the remote controller, and the channel selected by the preset code can be changed by reading new channel setting information and storing the new channel setting information in the nonvolatile memory of the broadcasting receiver.

2. The broadcasting receiver according to claim 1, wherein said reader reads any one of optical information, magnetic information, and weak radio wave information.

3. The broadcasting receiver according to claim 1 or 2, further comprising
   a section for setting a channel to be received after release of a stand-by state on the basis of priority channel information included in said channel setting information.

4. A remote controller for a broadcasting receiver that carries out channel selection control of the broadcasting receiver, comprising:
   a reader for reading from a medium having channel setting information recorded thereon the channel setting information; and
   a transmission section for transmitting to the broadcasting receiver the whole or a part of the read channel setting information,
   wherein the channel setting information is information corresponding to a preset code sent from the remote controller to the broadcasting receiver in response to pressing a channel selection button, and the preset code is made to correspond to different channel setting information by reading different channel setting information with the reader.

5. The remote controller for a broadcasting receiver according to claim 4, wherein
   said transmission section utilizes a remote control signal transmitter already provided in the remote controller.

6. The remote controller for a broadcasting receiver according to claim 4, further comprising
   an acquisition section for acquiring the channel setting information from another remote controller or another apparatus.

7. The remote controller for a broadcasting receiver according to claim 6, wherein
   said acquisition section utilizes said reader.

8. The remote controller for a broadcasting receiver according to claim 4, wherein
   said reader reads any one of optical information, magnetic information, and weak radio wave information.

9. A remote controller for a broadcasting receiver that carries out channel selection control of the broadcasting receiver, comprising:
   a reader for reading from a medium having channel setting information recorded thereon the channel setting information;
   a rewritable nonvolatile memory storing the read channel setting information; and a section for generating a remote control signal on the basis of the contents of an operation and the channel setting information, wherein the channel setting information is information corresponding to a preset code sent from the remote controller to the broadcasting receiver in response to pressing a channel selection button, and the preset code is made to correspond to different channel setting information by reading different channel setting information with the reader.

10. The remote controller for a broadcasting receiver according to claim 9, further comprising an acquisition section for acquiring the channel setting information from another remote controller or another apparatus.

11. The remote controller for a broadcasting receiver according to claim 10, wherein said acquisition section utilizes said reader.

12. The remote controller for a broadcasting receiver according to claim 9, wherein said reader reads any one of optical information, magnetic information, and weak radio wave information.

13. A broadcasting receiver comprising:

a section for storing in a rewritable nonvolatile memory channel setting information transmitted from a remote controller for the broadcasting receiver; and a section for judging a channel to be selected on the basis of a remote control signal for channel selection transmitted from said remote controller for the broadcasting receiver and said channel setting information, wherein the remote control signal for channel selection is a preset code transmitted from the remote controller and the channel setting information transmitted from the remote controller is information corresponding to the preset code, and the channel to be selected is judged based on a correspondence between the preset code and the channel setting information.

14. A broadcasting receiver comprising:

a section for storing in a rewritable nonvolatile memory channel setting information transmitted from a remote controller for the broadcasting receiver; and a section for setting a channel to be received after release of a stand-by state on the basis of priority channel information included in said channel setting information, wherein the remote controller comprises a reader for reading from a medium having channel setting information recorded thereon the channel setting information and a transmission section for transmitting to the broadcasting receiver the whole or a part of the read channel setting information.

15. The broadcasting receiver according to claim 13 or 14, wherein the channel setting information transmitted from the remote controller for the broadcasting receiver is received utilizing a remote control signal receiver.

16. A channel setting method comprising:

transmitting channel setting information to a communication device by communication;

receiving the transmitted channel setting information by the communication device;

printing out the received channel setting information by a printer of the communication device;

reading the printed channel setting information by a reader of a broadcasting receiver; and storing the read channel setting information in a memory of the broadcasting receiver.

17. The channel setting method according to claim 16, wherein the channel setting information is information in which a preset number corresponds to at least one of a physical channel number, receiving frequency information, and tuner control information.

18. The channel setting method according to claim 16, wherein the channel setting information includes information representing a logical channel number with respect to a preset number.

19. The channel setting method according to claim 16, wherein the channel setting information includes priority channel information for setting a channel to be received after release of a stand-by state.

20. A channel setting method comprising:

transmitting channel setting information to a communication device by communication;

receiving the transmitted channel setting information by the communication device;

printing out the received channel setting information by a printer of the communication device;

reading the printed channel setting information by a reader of a broadcasting receiver; and storing the read channel setting information in a memory of the broadcasting receiver, wherein the channel setting information includes information showing whether the broadcasting is analog broadcasting or digital broadcasting with respect to a preset number.

21. A channel setting system, comprising:

a distributable information recording medium storing channel setting information for setting channels in a broadcasting receiver, the channel setting information being recorded in a state readable by any one of reading utilizing light, reading utilizing magnetism, and reading utilizing weak radio waves;

a reader to read the channel setting information using one of light, magnetism and weak radio waves;

a memory to store the channel setting information read by the reader, wherein the channel setting information stored in the memory includes a correspondence between a preset number in a remote controller and a physical channel number.

* * * * *